(12) United States Patent
Kakuda

(10) Patent No.: US 6,557,885 B1
(45) Date of Patent: *May 6, 2003

(54) STROLLER WITH RELEASE LATCH

(75) Inventor: Baku Kakuda, Reading, PA (US)

(73) Assignee: Graco Children's Products Inc., Exton, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/911,999

(22) Filed: Aug. 15, 1997

(51) Int. Cl.$^7$ .................................................. B62B 1/12
(52) U.S. Cl. ........................................ 280/647; 280/642
(58) Field of Search ................................ 280/638, 639, 280/38, 641, 642, 644, 651, 655, 657, 658, 47.38, 647

(56) References Cited

U.S. PATENT DOCUMENTS

| 215,283 A | 5/1879 | Jury |
| 632,018 A | 8/1899 | Merkoolyeff |
| 867,894 A | 10/1907 | Moore |
| 924,008 A | 6/1909 | Smith |
| 1,053,325 A | 2/1913 | Smith |
| 1,125,934 A | 1/1915 | Beasecker et al. |
| 1,753,931 A | 4/1930 | Lewis |
| 2,341,117 A | 2/1944 | Reinholz |
| 2,378,931 A | 6/1945 | Kiesow |
| 2,480,570 A | 8/1949 | Goldberg |
| 2,534,539 A | 12/1950 | Topper |
| 2,616,719 A | 11/1952 | Heideman |
| 2,781,225 A | 2/1957 | Heideman |
| 2,989,318 A | 6/1961 | Schenkman |
| 3,061,328 A | 10/1962 | Konar |
| 3,248,125 A | 4/1966 | Gill |
| 3,459,435 A | 8/1969 | Garner |
| 3,556,546 A | 1/1971 | Garner |
| 3,692,323 A | 9/1972 | Sekine |
| 3,736,021 A | 5/1973 | MacLaren |
| 3,873,117 A | 3/1975 | Perego |
| 3,901,528 A | 8/1975 | Miyagi |
| 4,191,397 A | 3/1980 | Kassai |
| 4,248,443 A | 2/1981 | Ohlson |
| 4,317,581 A | 3/1982 | Kassai |
| 4,335,900 A | 6/1982 | Fleischer |
| 4,362,315 A | 12/1982 | Kassai |
| 4,564,212 A | 1/1986 | Orlandino et al. |

(List continued on next page.)

FOREIGN PATENT DOCUMENTS

EP          0481452          4/1992

Primary Examiner—Robert P. Olszewski
Assistant Examiner—Andrew J. Fischer
(74) Attorney, Agent, or Firm—Foley & Lardner

(57) ABSTRACT

An improved stroller is disclosed. The stroller preferably includes a frame which allows the stroller to collapse from an extended configuration. The stroller also allows an operator to easily collapse the stroller. The invention also provides a locking device to prevent inadvertent collapse of the stroller. The invention includes an actuator assembly in association with the locking device which may be actuated by the operator.

16 Claims, 6 Drawing Sheets

U.S. PATENT DOCUMENTS

| | | |
|---|---|---|
| 4,577,877 A | 3/1986 | Kasai |
| 4,586,399 A | 5/1986 | Kassai |
| 4,606,550 A | 8/1986 | Cone |
| 4,610,460 A | 9/1986 | Kassai |
| 4,632,420 A | 12/1986 | Miyagi |
| 4,632,421 A | 12/1986 | Shamie |
| 4,643,445 A | 2/1987 | Cabagnero |
| 4,660,850 A | 4/1987 | Nakao et al. |
| 4,741,551 A | 5/1988 | Perego |
| 4,763,911 A | 8/1988 | Gebhard et al. |
| 4,770,429 A | 9/1988 | Freyman |
| 4,770,437 A | 9/1988 | Gläser |
| 4,779,879 A | 10/1988 | Kassai |
| 4,817,982 A | 4/1989 | Kassai |
| 4,832,361 A | 5/1989 | Nakaao et al. |
| 4,836,573 A | 6/1989 | Gebhard |
| 4,846,494 A | 7/1989 | Kassai |
| 4,848,787 A | 7/1989 | Kassai |
| 4,906,017 A | 3/1990 | Kassai |
| 5,039,118 A | 8/1991 | Huang |
| 5,056,805 A | 10/1991 | Wang |
| 5,074,575 A | 12/1991 | Bigo |
| 5,087,066 A | 2/1992 | Mong-Hsing |
| 5,158,319 A | 10/1992 | Norcia et al. |
| 5,168,601 A | 12/1992 | Liu |
| 5,181,735 A | 1/1993 | Onishi |
| 5,184,835 A | 2/1993 | Huang |
| 5,205,577 A * | 4/1993 | Liu .......................... 280/642 |
| 5,205,578 A | 4/1993 | Liu |
| 5,205,579 A | 4/1993 | Kato et al. |
| 5,215,320 A | 6/1993 | Chen |
| 5,257,799 A | 11/1993 | Cone et al. |
| 5,362,089 A | 11/1994 | Jyan-Tsai |
| 5,388,852 A | 2/1995 | Bigo et al. |
| 5,417,450 A | 5/1995 | Wang |
| 5,421,603 A | 6/1995 | Wills et al. |
| 5,427,402 A | 6/1995 | Huang |
| 5,454,584 A | 10/1995 | Haut et al. |
| 5,460,398 A | 10/1995 | Huang |
| 5,472,224 A | 12/1995 | Cabagnero |
| 5,478,102 A | 12/1995 | Huang |
| 5,490,685 A | 2/1996 | Kitayama et al. |
| 5,524,503 A * | 6/1996 | Ishikura .................... 74/501.6 |
| 5,605,409 A | 2/1997 | Haut et al. |
| 5,725,238 A * | 3/1998 | Huang ...................... 280/642 |
| 5,775,718 A * | 7/1998 | Huang ...................... 280/642 |
| 5,938,229 A * | 8/1999 | Chen et al. ................ 280/642 |
| 5,979,928 A * | 11/1999 | Kuo .......................... 280/642 |
| 6,068,284 A * | 5/2000 | Kakuda .................... 280/642 |

* cited by examiner

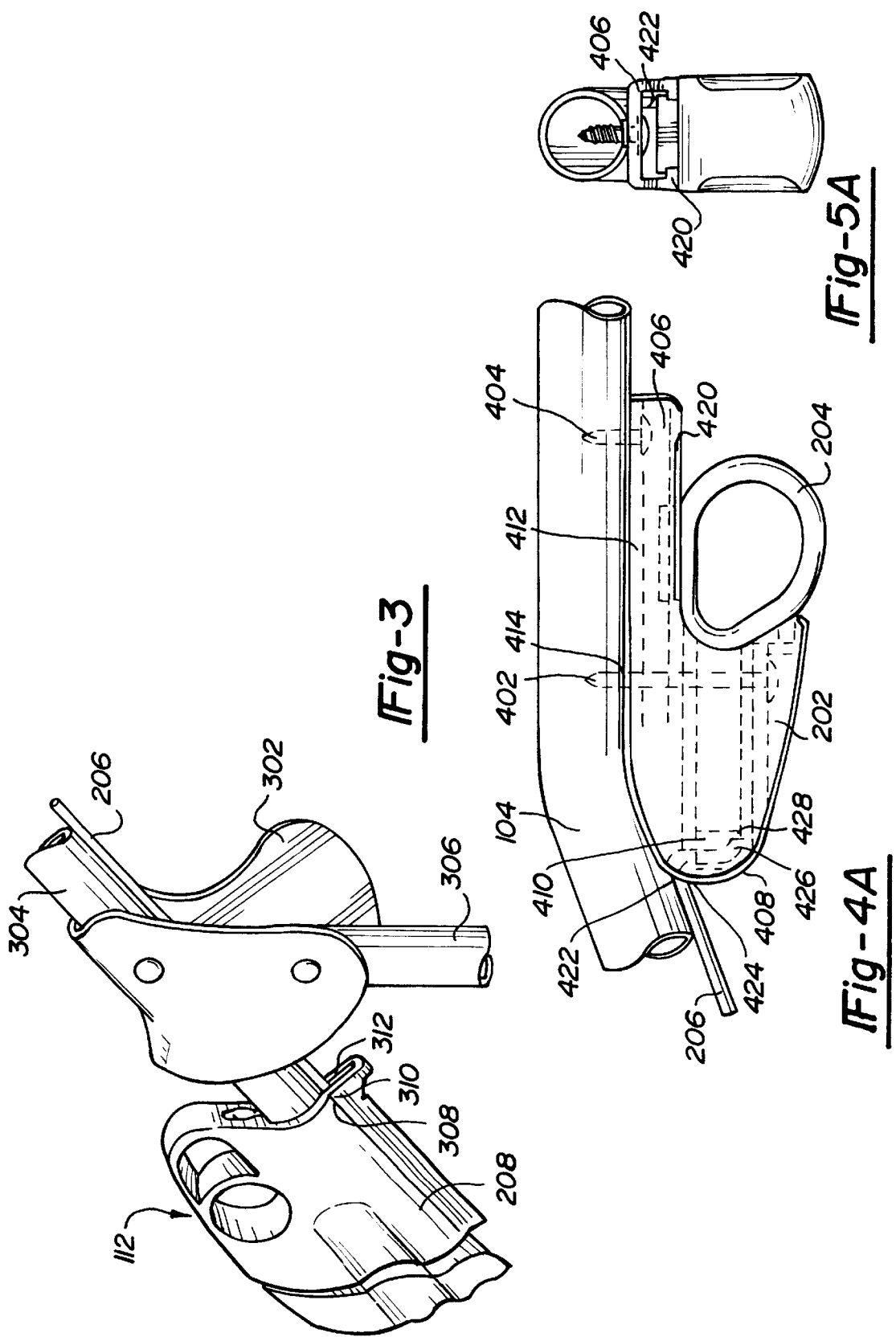

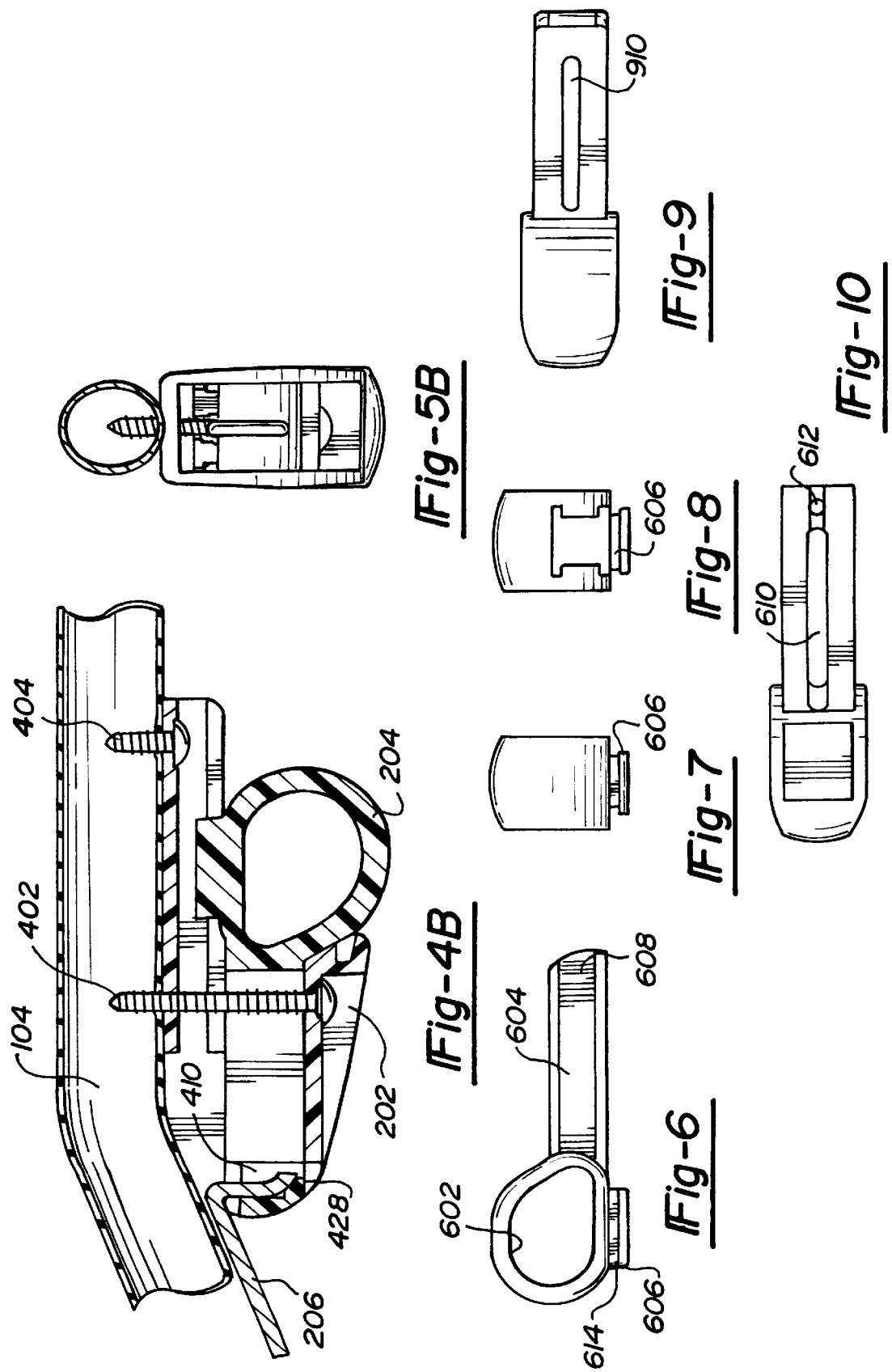

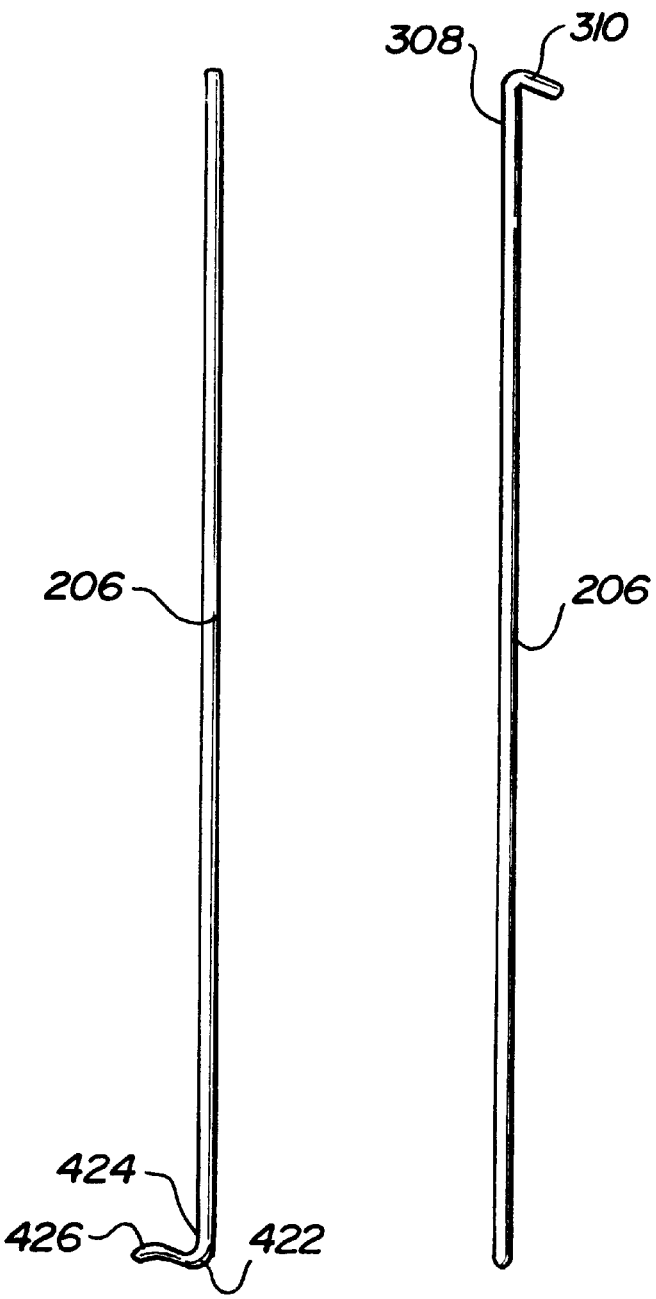

STROLLER WITH RELEASE LATCH

BACKGROUND OF THE INVENTION

1. Field of the Invention

The following invention is directed to a stroller, and more particularly to a stroller which can conveniently collapse to a non-use position.

2. Description of the Related Art

Collapsible strollers are well-known in the art. However, the mechanism which allows the stroller to collapse is generally cumbersome and often requires the user to inconveniently unlock the mechanism and collapse the stroller. This becomes increasingly difficult if the operator has a physical condition, such as a bad back or is pregnant, which may limit the operator's agility.

Mechanisms which allow the user to more conveniently collapse the stroller are also known. However, these mechanisms are generally mechanically complex, greatly increase the number of parts used on the stroller and therefore increase both cost and weight, cannot be retrofitted onto existing strollers, and have exposed joints and moving parts which could pose a danger to both the stroller's operators and passengers.

Additionally, the operating mechanisms of some conventional strollers with release bars are disadvantageous because items can get caught between the release bar and the handlebar, possibly pinching the operators' fingers. Further, the mechanisms with release bars generally. add weight to the stroller and are cumbersome and difficult to actuate. They also suffer from having exposed mechanical parts which are subject to wear and increased friction.

Other mechanisms which use either levers, buttons, or a rotary member, all have a high degree of mechanical complexity and a large number of small parts. These factors tend to reduce reliability and increase the frequency of breakdown.

There is currently a need for a stroller which is mechanically reliable, which has an easy to reach unlocking mechanism and which can be folded while the operator remains erect.

SUMMARY OF THE INVENTION

Accordingly, the present invention is directed to a stroller that substantially obviates one or more of the disadvantages of the related art strollers.

An object of the present invention is to provide a stroller that allows an operator to easily collapse the stroller.

Another object of the present invention is to provide a stroller that allows an operator to collapse the stroller conveniently and without having to bend over and reach down.

Yet another object of the present invention is to provide a stroller with a mechanism that allows easy collapse of the stroller.

Additional features and advantages of the invention will be set forth in the description which follows, and in part will be apparent from the description, or may be learned by practice of the invention. The objectives and other advantages of the invention will be realized and attained by the structure particularly pointed out in the written description and claims as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention are incorporated in and constitute a part of this specification, illustrate embodiments of the invention and together with the description serve to explain the principles of the invention. In the drawings:

FIG. 3 is an enlarged view of a locking device;

FIGS. 4A and 4B are side and cross-sectional views of the actuating assembly;

FIGS. 5A and 5B are rear and front views of the actuating assembly;

FIGS. 6–10 are a side, top, bottom and end views of the actuator;

FIG. 11–12 are side views of the rod; and

FIG. 13 is an end view of the rod.

DETAILED DESCRIPTION OF THE PREFERRED EMBODIMENTS

The present invention relates to a stroller, and more particularly to a collapsible stroller with an improved mechanism for folding the stroller. Reference will now be made in detail to the preferred embodiments of the present invention, examples of which are illustrated in the accompanying drawings.

Figure 1A:
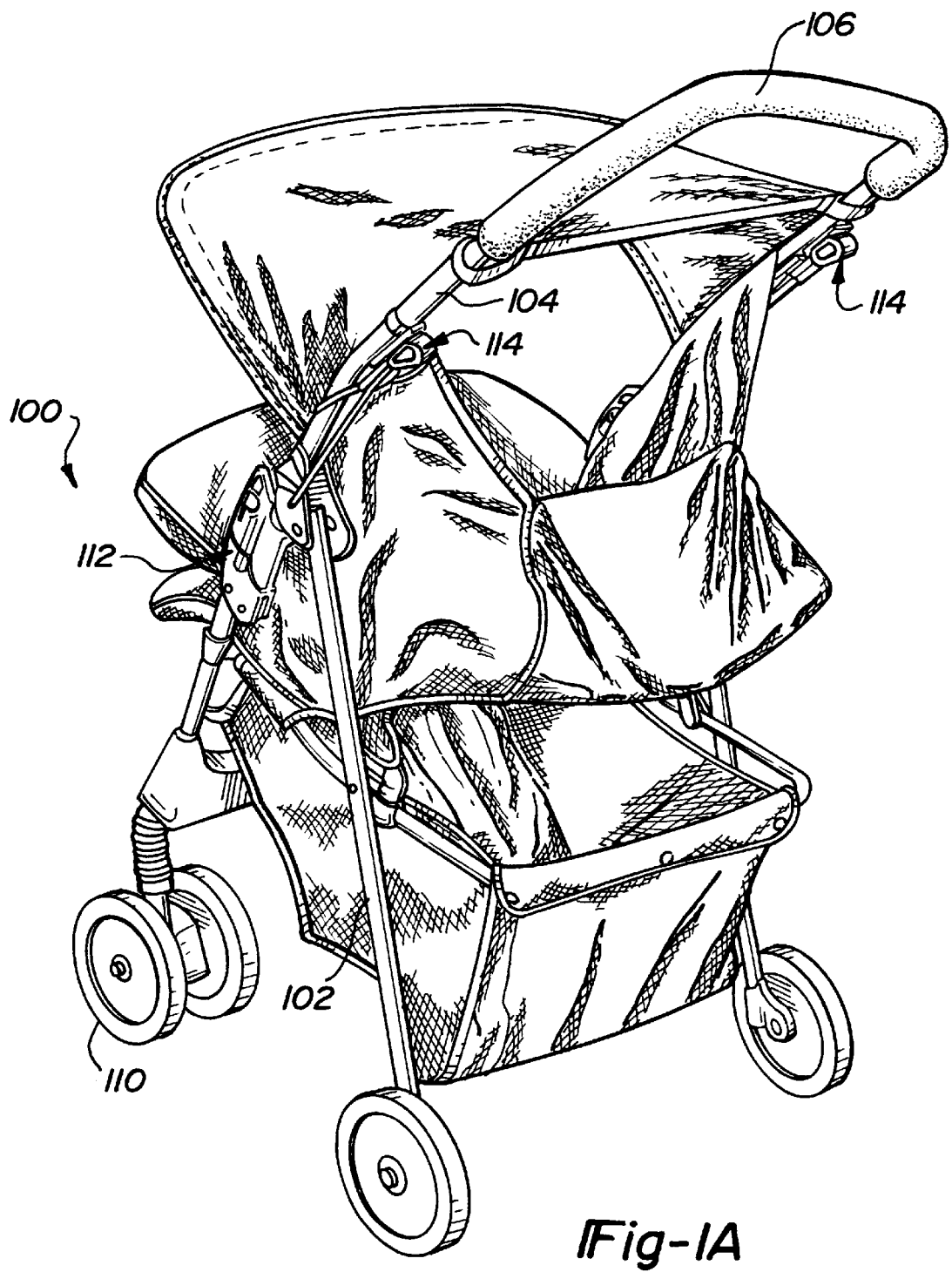
FIG. 1A and 1B are perspective views of strollers in accordance with the present invention.
Figure 1B:
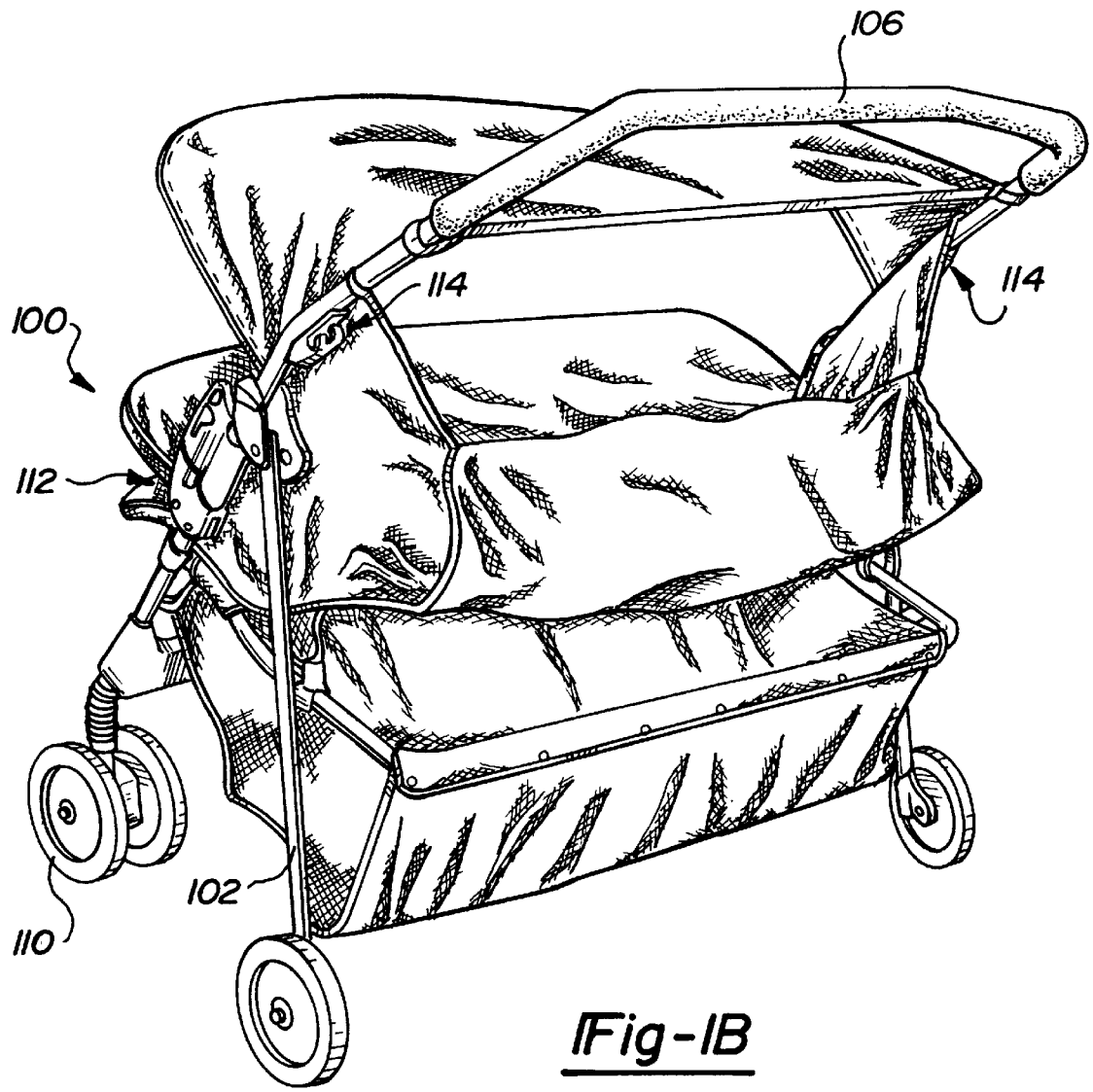
Figure 2:
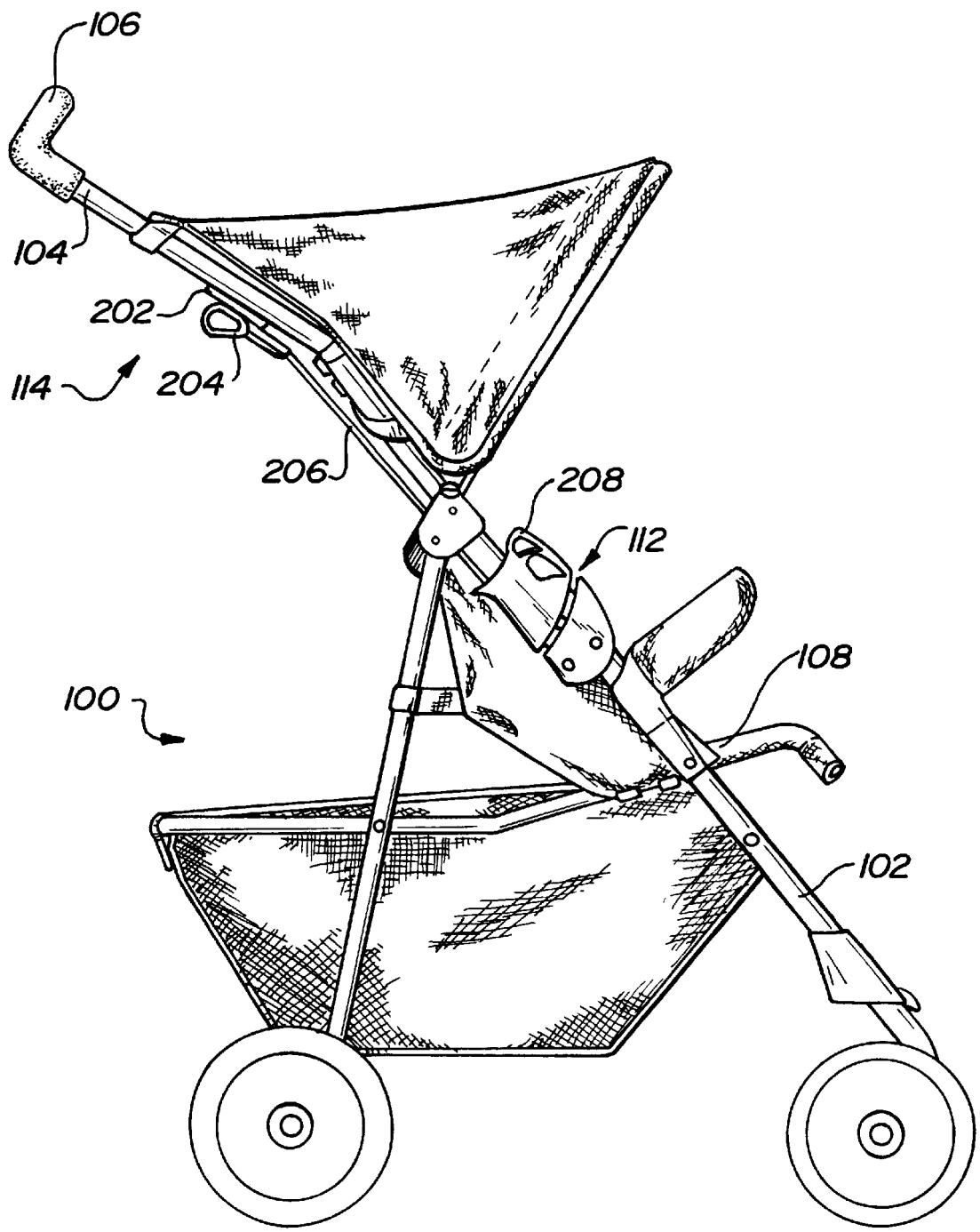
FIG. 2 is a side view of the stroller in accordance with the present invention.

FIGS. 1A, 1B, and 2 show a preferred embodiment of a stroller 100 in accordance with the present invention. The stroller generally comprises a frame 102 having a handle portion 104. The handle portion also includes a gripping portion 106. The stroller includes a passenger support 108, best seen in FIG. 2, that is used to hold a child. A suitable number of wheels 110 to allow easy transport are provided. The preferred stroller 100 also includes at least one locking device 112. This locking device allows the stroller to collapse from an extended position as shown in FIGS. 1A and 1B to a collapsed position. The specific structural details of an exemplary stroller and the associated elements which allow the stroller to collapse are fully discussed in the Assignee's prior patent, U.S. Pat. No. 5,454,584, issued on Oct. 3, 1995, which is incorporated by reference. This improved stroller includes at least one actuating assembly 114 which actuates at least one of the locking devices 112.

Turning to the side view shown in FIG. 2, a general overview of the preferred mechanism can be observed. The preferred mechanism includes an actuating assembly 114 which comprises a stationary member 202 and an actuator 204. The actuator 204 is connected to a connector, such as rod 206, and the rod 206 is connected to a latch member, such as slidable catch 208, of the locking device 112. Also, the locking device 112 includes a spring (not shown) to bias the slidable catch 208 into a latching position. Since the rod 206 is connected to the slidable catch 208 and the actuator 204, the actuator 204 is biased into the stationary member 202 when the stroller 100 is in the extended configuration. The specific structural details of the locking device 112 can be gathered from Assignee's prior patent, U.S. Pat. No. 5,454,584, issued on Oct. 3, 1995, which is incorporated by reference.

One feature of the present invention is to allow an operator to more easily collapse the stroller. By placing the actuator 204 in a location that is vertically higher than the location of the slidable catch 208, the operator does not have to lean forward and bend over as much to release the locking device 112 to collapse the stroller since the actuator 204 is in a more convenient location. This feature is particularly important if the operator has a physical condition that may make leaning forward or bending over difficult, for example: a bad back or pregnancy. This feature is also important if the stroller of the present invention is a dual stroller. That is, if the stroller is of the type in which two passengers ride side by side.

Turning now to FIGS. 3, 4A, and 4B, the specific details of a preferred embodiment will now be disclosed. FIG. 3 shows an enlarged isometric view of the locking device 112 and rod 206. As shown in the drawing, rod 206 runs generally parallel to arm 304. The rod 206 preferably runs through hinge 302 and in between arm 304 and leg 306. The rod 206 terminates in a first end 308. The first end 308 preferably includes a bend or hook 310 that cooperates with an aperture 312 formed on the slidable catch 208. When the parts are assembled in the manner disclosed above, the present invention allows the rod 206 to move the slidable catch 208.

The rod 206 terminates in a second end 422, preferably connected to actuator 204 as shown in FIGS. 4A and 4B.

FIGS. 4A, 4B, 5A, and 5B show the components attached at the other end of rod 206. A stationary member 202 is rigidly connected to handle portion 104 by a series of screws 402 and 404. The stationary member 202 includes a forward portion 408 that includes a rod entry portion 410. Preferably, the forward portion 408 of the stationary member 202 is open as shown in FIG. 5B. As rod 206 is pulled by actuator 204, the open forward portion 408 allows the rod 206 to move freely into the stationary member 202.

Preferably, the stationary member 202 also has a top portion 412 that is adjacent to the handle portion 104 and a side portion 406. The top portion 412 preferably has at least one hole 414 for a fastener 402 or 404. The rear and central portions of the stationary member include at least one guide member 420. In the exemplary embodiment shown in FIGS. 4A–B and 5A–B, the guide member 420 comprises a T-slot 422. The interior of the stationary member 202 is generally hollow and designed to accommodate the actuator 204 as shown in FIGS. 4A and 4B.

The actuator 204, as shown in FIG. 4A and 4B, includes a socket 428 which is engaged by the end of the rod 206. The actuator 204, shown in greater detail in FIGS. 6–10, includes a finger pull 602 and a beam portion 604. A follower 606, best shown in FIGS. 6–8, is disposed below the finger pull 602. Preferably, the follower 606 has at least one groove 614. In the preferred embodiment, follower 606 has two grooves 614. The forward end of the beam portion 604 includes a rod receiving portion 608. The preferred embodiment contemplates the use of an aperture 612 formed vertically on the forward end of beam portion 604 to receive the other end 322 (see FIGS. 4A and 4B) of rod 206.

Preferably the beam portion 604 also includes an elongated slot 910, best shown in FIGS. 9 and 10. Returning to FIGS. 4A, 4B, 5A, and 5B, the relationships between the stationary member 202 and actuator 204 can be observed. Fastener 402 connects the stationary member 202 to the handle portion 104. In the preferred embodiment, the elongated slot 910 is sized to allow the actuator 204 to move along the stationary member 202 even though fastener 402 is mounted through the slot 910 as shown in FIGS. 4A and 4B.

Referring to FIG. 5A and 5B, the stationary member 202 is shown as mounted on to handle portion 104 with fastener 404 shown. In FIG. 5A and 5B, the preferred embodiment of the T-slot 422 is shown. The follower 606 of the actuator 204 is shown mounted in T-slot 422. The preferred embodiment of the T-slot includes at least one guide member 420 that engages a groove 614 on the follower 606 of the actuator 204. Preferably, the follower 606 rests on guide members 420. The height of the T-slot 422 is high enough both to allow the follower 606 to move along the guide members 420 of the stationary member 202 and to accommodate the head of fastener 404 as shown in FIG. 5A and 5B.

In the preferred embodiment, the beam portion 604 of the actuator 204 extends from the finger pull 602. Referring to FIGS. 4A and 4B, the stationary member 202 receives the beam portion 604. As noted earlier, the second end 318 of the rod 206 extends into the forward portion 408 of the stationary member 202 and engages the aperture 612 of the rod receiving portion 608 of the actuator 204.

In order to release the locking device 112 and to collapse the stroller 100, the operator moves the actuator 204. Preferably, the operator engages the finger pull 602 of the actuator 204. Referring to FIGS. 4A and 4B, as the actuator 204 is pulled to the right in the orientation as shown in FIGS. 4A and 4B, the rod 206 is correspondingly moved to the right due to its connection with the actuator 204.

As the actuator 204 is moved to the right, follower 606 moves along the guide members 420 of the stationary member 202. As discussed previously, in the preferred embodiment the forward portion 408 of the stationary member 202 has an opening and hollow portion that provides clearance for the rod 206 as it is pulled into the stationary member 202 by the movement of the actuator 204.

In the preferred embodiment, the rod 206 moves due to the movement of the actuator 204. Since the first end 308 of the rod 206 is connected to the slidable catch 208, the movement of the actuator 204 moves the slidable catch 208. As the slidable catch 208 is moved, the locking device 112 is released and the stroller 100 may be collapsed.

Referring to FIGS. 11–13, the preferred embodiment of the rod is shown. As previously described, the first end 308 of rod 206 includes a bend or hook 310 as shown in FIG. 12. Preferably, the rod 206 has a second end 422 with at least one bend 424. In the preferred embodiment, the second end 422 has two bends 424 and 426. The two bends 424 and 426 are shown in FIG. 11.

In the preferred embodiment, rod 206 has a longitudinal axis. FIG. 13 is a view from the perspective of looking along the longitudinal axis of rod 206. As shown in FIG. 13, the first end 308 and the second end 422 of rod 206 are skewed and are formed at an angle with respect to one another.

Any of the features of the invention disclosed can be used separately, or the features of the present invention can be combined and used together.

While the preferred material for the stationary member and the actuator is plastic, metal or any suitable material may be used. While the preferred material for the rod is plastic, metal or any suitable material may be used.

It will be apparent to those skilled in the art that various modifications and variations can be made in the child walker of the present invention without departing from the spirit or scope of the invention. Thus, it is intended that the present invention cover the modifications and variations of this invention provided they come within the scope of the appended claims and their equivalents.

I claim:

1. A stroller with wheels and a passenger support portion comprising:

a frame having a first extended configuration and a second collapsed configuration, a portion of the frame defining a handle portion having a gripping portion;

an actuating assembly connected to the handle portion and slidable therealong between a first latched position and a second release position closer to the gripping portion;

a connector connected to the actuating assembly; and at least one latch member connected to the connector, wherein the actuating assembly transmits a force to the at least one latch member to release the at least one latch member when the actuating assembly is moved from its first to its second position to allow the stroller to collapse into the collapsed configuration, the at least one latch member comprising a slidable catch that is slidable between a latched position and a release position.

2. The stroller according to claim 1 wherein the actuating assembly comprises a stationary member and an actuator.

3. The stroller according to claim 2 wherein the stationary member is mounted on the handle portion.

4. The stroller according to claim 2 wherein the stationary member has a portion defining a socket and the actuator has a portion defining an extension, and wherein the extension of the actuator engages the socket of the stationary member.

5. The stroller according to claim 2 wherein the stationary member includes a portion defining a slot, the actuator includes a portion having a shoulder defining at least one groove and wherein the shoulder of the actuator engages the slot of the stationary member.

6. The stroller according to claim 2 wherein the actuator includes a portion into which an end of the connector is mounted.

7. The stroller according to claim 1 wherein the at least one latch member includes apportion into which an end of the connector is mounted.

8. The stroller according to claim 1 wherein the frame includes an arm connected to a hinge, the hinge is connected to a leg, and the connector is mounted between the arm and the leg.

9. A stroller with wheels and a passenger support portion comprising:

a frame having a first extended configuration and a second collapsed configuration, a portion of the frame defining a handle portion having a gripping portion;

an actuating assembly connected to the handle portion and slidable therealong between a first latched position and a second release position closer to the gripping portion, wherein the actuating assembly comprises a stationary member mounted on the handle portion and at least one actuator slidably mounted to the stationary member;

a connector connected to the actuating assembly; and at least one latch member connected to the connector wherein the at least one actuator may be operated to release the latch member when the at least one actuator is moved between its first and second positions to allow the frame to collapse, said at least one latch member comprising a slidable catch.

10. The stroller according to claim 9 wherein the stationary member has a portion defining a socket and the at least one actuator has a portion defining an extension, and wherein the extension of the at least one actuator engages the socket of the stationary member.

11. The stroller according to claim 9 wherein the stationary member includes at portion defining a slot, the at least one actuator includes a portion having a shoulder defining at least one groove and wherein the shoulder of the at least one actuator engages the slot of the stationary member.

12. The stroller according to claim 9 wherein the frame includes an arm connected to a hinge, the hinge connected to a leg and the connector is mounted between the arm and the leg.

13. A stroller with wheels and a passenger support portion comprising:

a frame having a first extended configuration and a second collapsed configuration, a portion of the frame defining a handle portion;

an actuating assembly connected to the handle portion;

a connector connected to the actuating assembly, said connector including a rod, said rod including a bent portion at each end; and at least one latch member connected to the connector wherein the actuating assembly transmits a force to at least one latch member to release the at least one latch member to allow the stroller to collapse into the collapsed configuration.

14. The stroller according to claim 13, wherein one of the bent portions includes two bends.

15. A stroller with wheels and a passenger support portion comprising:

a frame having a first extended configuration and a second collapsed configuration, a portion of the frame defining a handle portion;

an actuating assembly connected to the handle portion wherein the actuating assembly comprises a stationary member and at least one actuator;

a connector connected to the actuating assembly, said connector including a rod, said rod including a bent portion at each end; and at least one latch member having at least one actuator, the at least one latch member connected to the connector wherein the at least one actuator may be operated to allow the frame to collapse, said at least one latch member comprising a slidable catch.

16. The stroller according to claim 15, wherein one of the bent portions include two bends.

* * * * *

UNITED STATES PATENT AND TRADEMARK OFFICE
CERTIFICATE OF CORRECTION

PATENT NO. : 6,557,885 B1
DATED : May 6, 2003
INVENTOR(S) : Baku Kakuda

It is certified that error appears in the above-identified patent and that said Letters Patent is hereby corrected as shown below:

Column 6,
Line 53, please insert the following claims:
-- 17. The stroller according to claim 9 wherein the at least one actuator includes a portion into which an end of the connector is mounted.
    18. The stroller according to claim 9 wherein the at least one latch member includes a portion into which an end of the connector is mounted. --

Signed and Sealed this

Thirtieth Day of September, 2003

JAMES E. ROGAN
*Director of the United States Patent and Trademark Office*